United States Patent
Subramoney et al.

(10) Patent No.: US 7,577,947 B2
(45) Date of Patent: Aug. 18, 2009

(54) METHODS AND APPARATUS TO DYNAMICALLY INSERT PREFETCH INSTRUCTIONS BASED ON GARBAGE COLLECTOR ANALYSIS AND LAYOUT OF OBJECTS

(75) Inventors: Sreenivas Subramoney, Palo Alto, CA (US); Mauricio J. Serrano, San Jose, CA (US); Richard L. Hudson, Florence, MA (US); Ali-Reza Adl-Tabatabai, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 1135 days.

(21) Appl. No.: 10/741,897

(22) Filed: Dec. 19, 2003

(65) Prior Publication Data
US 2005/0138329 A1 Jun. 23, 2005

(51) Int. Cl.
*G06F 9/45* (2006.01)
(52) U.S. Cl. .................. 717/151; 711/213; 712/207
(58) Field of Classification Search ............. 717/126, 717/127, 151, 153–159; 712/228, 207, 216, 712/219; 711/213
See application file for complete search history.

(56) References Cited

U.S. PATENT DOCUMENTS

| 5,964,867 | A | * | 10/1999 | Anderson et al. ............ 712/219 |
|---|---|---|---|---|
| 6,145,121 | A | * | 11/2000 | Levy et al. .................. 717/135 |
| 6,567,975 | B1 | * | 5/2003 | Damron ....................... 717/155 |
| 6,728,955 | B1 | * | 4/2004 | Berry et al. ................. 717/158 |
| 6,782,454 | B1 | * | 8/2004 | Damron ....................... 711/137 |
| 2002/0073405 | A1 | * | 6/2002 | Chilimbi ..................... 717/151 |
| 2003/0145314 | A1 | | 7/2003 | Nguyen et al. |
| 2004/0261062 | A1 | * | 12/2004 | Chilimbi ..................... 717/126 |
| 2005/0120337 | A1 | * | 6/2005 | Serrano et al. .............. 717/127 |
| 2005/0177822 | A1 | * | 8/2005 | Kuch et al. .................. 717/155 |
| 2006/0059474 | A1 | * | 3/2006 | Bhansali et al. ............. 717/151 |
| 2007/0174597 | A1 | * | 7/2007 | Joy et al. .................... 712/228 |

OTHER PUBLICATIONS

Luk et al. "Compiler-Based Prefetching for Recursive Data Structures", Sep. 1996, ACM SIGPLAN Notices, vol. 31, Issue 9, pp. 222-233.*
Lu et al. "The Performance of Runtime Data Cache Prefetching in a Dynamic Optimization System", Dec. 3-5, 2003, 36th Annual IEEE/ACM International Symposium on Microarchitecture, 2003.*
Chilimbi et al., *Using Generational Garbage Collection to Implement Cache-Conscious Data Placement*, in the Proceedings of the International Symposium on Memory Management 37 (1998).

(Continued)

*Primary Examiner*—Lewis A Bullock, Jr.
*Assistant Examiner*—Jue S Wang
(74) *Attorney, Agent, or Firm*—Hanley, Flight & Zimmerman, LLC (57) ABSTRACT

Methods and apparatus to dynamically insert prefetch instructions are disclosed. In an example method, one or more samples associated with cache misses are identified from a performance monitoring unit in a processor system. Based on sample information associated with the one or more samples, delinquent information is generated. To dynamically insert one or more prefetch instructions, a prefetch point is identified based on the delinquent information.

30 Claims, 5 Drawing Sheets

OTHER PUBLICATIONS

Calder et al., *Cache-Conscious Data Placement*, in the Proceedings of the Eighth International Conference on Architectural Support for Programming Languages and Operating Systems 139 (1998).

Chilimbi et al., *Cache-Conscious Structure Layout*, in the SIGNPLAN Conference on Programming Language Design and Implementation 1 (1999).

Dimpsey et al., *Java Server Performance: A Case Study of Building Efficient, Scalable Jvms*, 39 IBM Systems Journal 151 (2000).

Arnold et al., *Adaptive Optimization in the Jalapeno JVM: The Controller's Analytical Model*, in ACM Conference on Object-Oriented Programming Systems, Languages, and Applications (2000).

Chilimbi et al., *Dynamic Hot Data Stream Prefetching for General-Purpose Programs*, in the Proceedings of the ACM SIGPLAN Conference on Programming Language Design and Implementation 199 (2002).

Liao et al., *Post-Pass Binary Adaptation for Software-Based Speculative Precomputation*, in the Proceedings of the ACM SIGPLAN Conference on Programming Language Design and Iimplementation 117 (2002).

Luk et al., *Profile-Guided Post-Link Stride Prefetching*, in the Proceedings of the International Conference on Supercomputing 167 (2002).

Shuf et al., *Creating and Preserving Locality of Java Applications at Allocation and Garbage Collection Times*, in the Proceedings of the ACM SIGPLAN Conference on Object-Oriented Programming, Systems, Languages, and Applications 13 (2002).

Inagaki et al., *Stride Prefetching by Dynamically Inspecting Objects*, in the Proceedings of the ACM SIGPLAN Conference on Programming Language, Design and Implementation 269 (2003).

Wu et al., *Value-Profile Guided Stride Prefetching for Irregular Code*, in the Proceedings of the 11th International Conference on Compiler Construction 307 (2002).

Choi Y., Knies A., Vedaraman G., Williamson J., *Design and Experience: Using the Intel Itanium 2 Processor Performance Monitoring Unit to Implement Feedback Optimizations*, $2^{nd}$ Workshop on EPIC Architectures and Compiler Technology, pp. 1-11, XP002326247, pp. 1-3 (Nov. 18, 2002).

Chilimbi, T.M., *Efficient Representations and Abstractions for Quantifying and Exploiting Data Reference Locality*, ACM SIGPlan 2001 Conference on Programming Language Design and Implementation, pp. 1-12, XP002326248, pp. 4-5; Fig. 4 (Jun. 2001).

Inagaki, T., Onodera, T., Komatsu, H., Nakatani, T., *Stride Prefetching by Dynamically Inspecting Objects*, Proceedings of the ACM SIGPlan 2003 Conference on Programming Language Design and Implementation, pp. 269-277, XP002326249, p. 274 (Jun. 9, 2003).

Chilimbi, T.M., et al., *Using Generational Garbage Collection to Implement Cache-Conscious Data Placement*, ACM SIGPlan Notices, Association for Computing Machinery, New York, US, vol. 34, No. 3, pp. 37-48, XP000993595, ISSN: 0362-1340, pp. 37-48 (Mar. 1999).

Tabatabai, A., et al., *Prefetch Injection Based on Hardware Monitoring and Object Metadata*, Proceedings of the ACM SIGPlan 2004 Conference on Programming Language Design and Implementation, pp. 267-276, XP002326250, pp. 267-276 (Jun. 9, 2004).

Written Opinion for PCT/US2004/040482 (May 25, 2005).

International Search Report for PCT/US2004/040482 (May 25, 2005).

Jacobson E. et al., Assigning confidence to conditional branch predictions, *Proceedings of the $29^{th}$ Annual IEEE/ACM International Symposium on Microarchitectur, Micro-29*, Dec. 2-4, 1996, *Proceedings of the Annual IEEE/ACM International Symposium on Microarchitecture. (MICRO)*, Los Alamitos, IEEE Comp. Soc. Press, U, vol. SYMP. 29, Dec. 2, 1996, pp. 142-152.

International Preliminary Report on Patentability corresponding to International Patent Application Serial No. PCT/US2004/040482, mailed Jun. 29, 2006, 9 pages.

* cited by examiner

METHODS AND APPARATUS TO DYNAMICALLY INSERT PREFETCH INSTRUCTIONS BASED ON GARBAGE COLLECTOR ANALYSIS AND LAYOUT OF OBJECTS

TECHNICAL FIELD

The present disclosure relates generally to compilers, and more particularly, to methods and apparatus to dynamically insert prefetch instructions based on garbage collector analysis and layout of objects.

BACKGROUND

In an effort to improve and optimize performance of processor systems, many different prefetching techniques (i.e., anticipating the need for data input requests) are used to remove or "hide" latency (i.e., delay) of processor systems.

Prefetching addresses the memory latency problem by fetching data into processor caches prior to their use. To prefetch in a timely manner, the processor must materialize a prefetch address early enough to overlap the prefetch latency with other computations and/or latencies. For either hardware-based or software-based strategies, prefetching for linked data structures (LDSs) remains a major challenge because serial data dependencies between elements in an LDS preclude timely materialization of prefetch addresses. On the other hand, when accessing a data array structure where the address of subsequent objects may be calculated from the base of the data array structure, loops may be unrolled and techniques such as stride prefetching may be performed to avoid cache misses while iterating through the data array structure. These array prefetching techniques assume that the address of subsequent objects may be calculated using the base of the data array structure. However, most LDSs do not have layout properties that may be exploited by stride prefetching techniques. Further, the gap between processor and memory speeds continues to increase. As a result, managed runtime environments (MRTEs) may encounter difficulties when attempting to insert prefetch instructions properly to reduce latencies while traversing LDSs.

DETAILED DESCRIPTION

Although the following discloses example systems including, among other components, software or firmware executed on hardware, it should be noted that such systems are merely illustrative and should not be considered as limiting. For example, it is contemplated that any or all of the disclosed hardware, software, and/or firmware components could be embodied exclusively in hardware, exclusively in software, exclusively in firmware or in some combination of hardware, software, and/or firmware.

In general, methods and apparatus to enable prefetching linked data structures that closely integrates a hardware performance monitoring unit and the garbage collector's global knowledge of heap and object layout are disclosed herein. In particular, the garbage collector uses the data cache miss information from the performance monitoring unit to first identify cache-miss intensive traversal paths through linked data structures, and then to discover regular distances between objects along these linked data structures. Using this information, prefetch targets are materialized in a timely fashion and prefetches are injected to improve memory subsystem performance.

Figure 1:
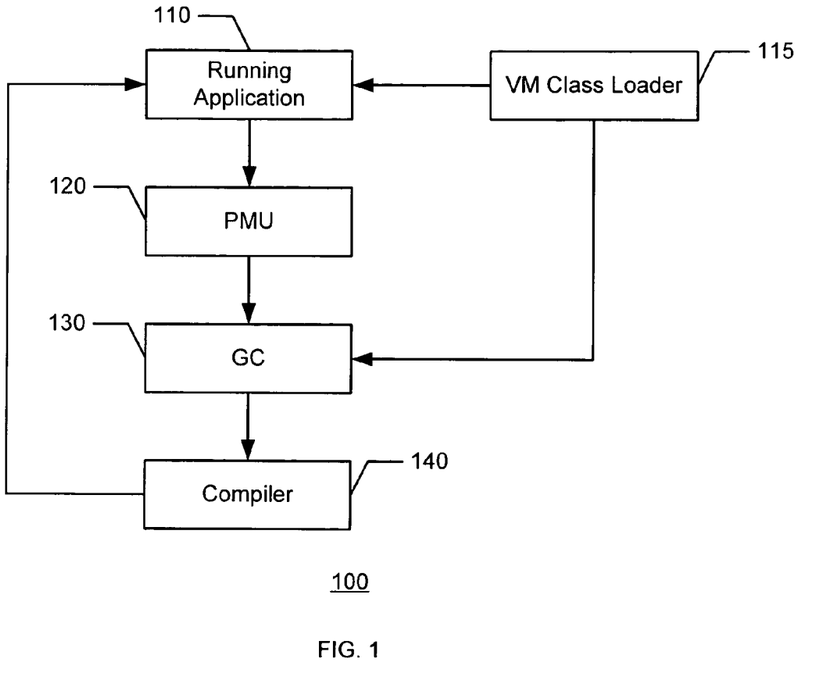
FIG. 1 is a block diagram representation of an example prefetch instruction insertion system.

In the example of FIG. 1, the illustrated prefetch instruction insertion system 100 includes a running application 110, a virtual machine (VM) class loader 115, a performance monitoring unit (PMU) 120, a garbage collector (GC) 130, and a compiler 140. In general and as described in detail below, the PMU 120 (e.g., hardware) provides samples of high latency cache miss. Each sample includes the instruction pointer (IP) address and the referent effective address (EA) of the memory access. The GC 130 abstracts the raw samples from the PMU 120 into objects that caused the cache misses, and then into a high-level metadata graph. The high-level metadata graph includes nodes representing object types annotated with IP addresses, and edges representing relations induced by fields and array elements containing referent EAs. During heap traversal, the GC 130 uses object samples to discover edges in the metadata graph that represent high latency traversals between linked data. The GC 130 then composes the edges into paths representing LDS traversals that cause high latency cache misses in the running application 110. Taking advantage of object placement, the GC 130 determines regular deltas between objects along the paths. The compiler 140 combines the address of the first object in the path with the deltas to materialize prefetch targets. The resulting address information is used to inject prefetch instructions at the appropriate code location. As a result, the miss latency experienced by the first object in a traversal path hides the miss latency of subsequent objects along the traversal path.

The running application 110 (also known as a mutator) includes one or more methods (i.e., functions, routines, or subroutines for manipulating data) compiled into instructions that a processor (e.g., the processor 1020 of FIG. 10) can execute. Persons of ordinary skill in the art will readily recognize that the VM class loader 115 is configured to maintain metadata structures such as a VTable, which includes fields that identify the type of an object (i.e., indicates how a VM internally identifies a type).

The PMU 120 allows software sampling of hardware events. The sampling rate may be software controllable and approximated to limit the granularity. Thus, the PMU 120 may not provide snapshots of consecutive sequences of misses. One of the major challenges is to reconstruct the consecutive sequences of misses. Each sample from the PMU 120 forms a raw tuple comprising the load IP (i.e., the instruction causing the miss), the target EA (i.e., the address of the data being loaded), and the latency of the load causing the miss. The PMU 120 may be configured to sample only high latency cache misses. Accordingly, the PMU 120 may eliminate misses between cache levels that reside on the processor chip and leave only the misses that access off-chip memory. Further, the GC 130 may eliminate non-heap misses by removing samples with addresses that do not fall within the heap.

The PMU 120 is configured to identify samples associated with cache misses when the running application 110 is executed under the control of an MRTE. Each sample includes information associated with a cache miss such as an effective address of the cache miss, an IP of an instruction causing the cache miss, and latency information of the cache miss. The effective address includes an address of data accessible by the instruction. The IP includes an address of the instruction (e.g., a load instruction) causing the cache miss. The latency information includes a number of cycle(s) required to service the cache miss.

The GC 130 is configured to perform heap traversals to mark and scan managed heap objects (i.e., data structures) reachable by the running application 110. Persons of ordinary skill in the art will readily recognize that the heap is an area of memory that an application may use to store an amount of data, which varies based on the operation of the application. If the GC 130 determines that an object is not reachable from roots, this area of the heap may be used by another object. During a heap traversal, the GC 130 identifies delinquent information so that the compiler 140 may insert prefetch instructions. In particular, the GC 130 uses the objects associated with the samples from the PMU 120 to collect detailed statistics on the connectivity between delinquent types in a heap. That is, the GC 130 determines whether a delinquent object or type is linked to another delinquent object or type.

Figure 5:
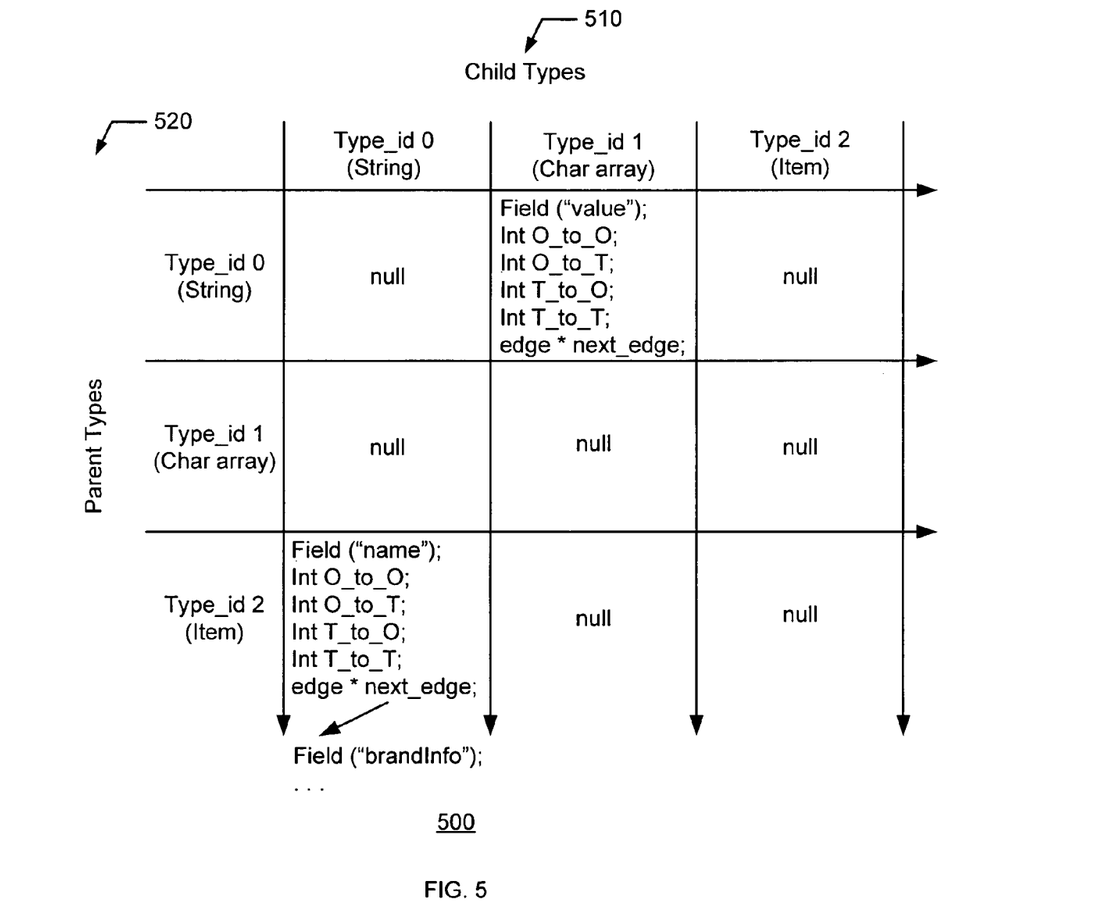
FIG. 5 is a diagrammatic representation of an example delinquent metadata table associated with the example metadata graph shown in FIG. 4.

The connectivity between delinquent types is used to approximate the traversal paths of the running application 110. Statistics associated with the connectivity are accumulated in a dynamic metadata table (DMT) (e.g., a portion of the DMT 500 is shown in FIG. 5). The DMT identifies the relationships between delinquent types including common paths for the delinquent types. The GC 130 generates the DMT during the heap traversal.

In particular, the GC 130 determines the delinquent types based on the delinquent objects identified from the EAs in samples from the PMU 120. For each object, the GC 130 identifies the type of the object. When the type is identified for the first time, the count associated with the type is initialized to one and the cumulative latency associated with the type is set to the latency of the cache miss. If the type of the object has been identified before, the count associated with the type is incremented and the cumulative latency associated with the type is increased by the latency of the cache miss. The weight of the delinquent types is the total of the latencies. After processing all of the delinquent objects, the GC 130 sorts the delinquent types by the cumulative latency. The GC 130 discards the delinquent types that do not contribute substantially to the overall latency.

The compiler 140 (e.g., a JIT compiler) is configured to identify prefetching points for a base type, and to insert prefetch instructions into the running application 110 at the prefetching points based on the delinquent information developed by the GC 130.

Figure 2:
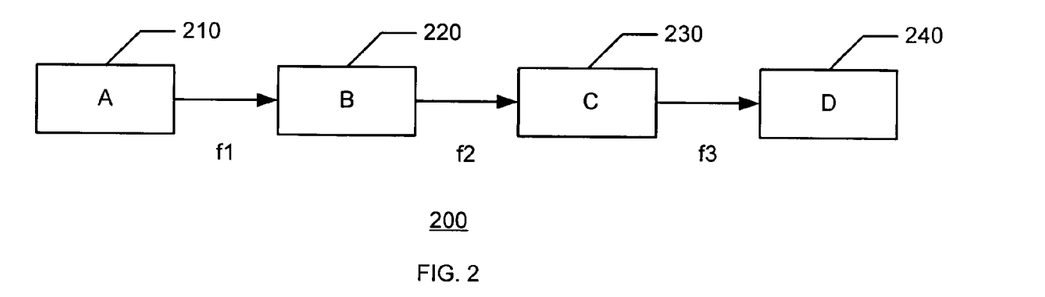
FIG. 2 is a block diagram representation of an example LDS.
Figure 3:
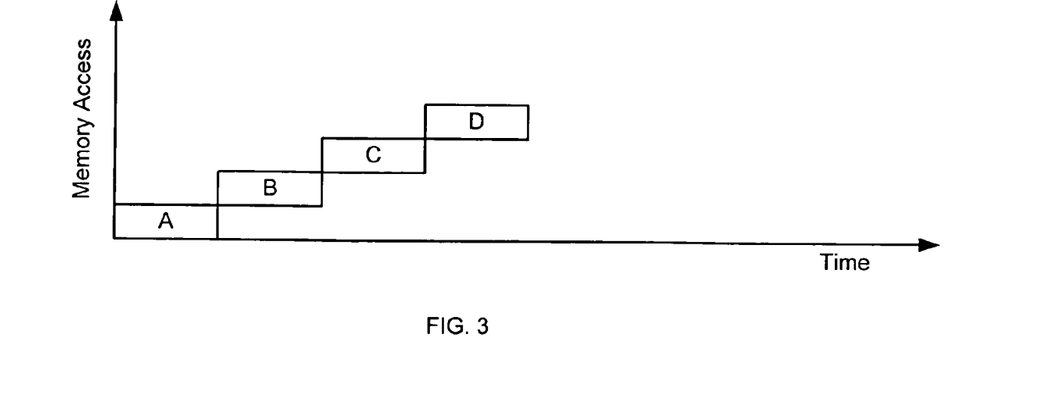
FIG. 3 is a timing diagram representation of one manner in which the example LDS shown in FIG. 2 may be traversed during runtime.

In the example of FIGS. 2 and 3, the illustrated LDS 200 includes objects, generally shown as object A 210, object B 220, object C 230, and object D 240. Each of the objects may include one or more reference fields. For example, object A 210 may include reference field f1, object B 220 may include reference field f2, and object C 230 may include reference field f3. The LDS 200 is a collection of objects that are traversed using pointers found in the preceding object(s). Traversing the LDS 200 may result in a high latency cache miss on each object in the LDS 200. Cache misses may be unavoidable because an address of an object in the LDS 200 is loaded from the preceding object before the object itself may be loaded (i.e., serially dependent). Without implementing the example prefetch instruction insertion system 100 described herein, the LDS 200 serializes cache misses during traversal as illustrated in FIG. 3. For example, reference field f1 located in object A 210 is loaded before object B 220 may be loaded. Likewise, reference field f2 located in object B 220 is loaded before object C 230 may be loaded, and reference field f3 located in object C 230 is loaded before object D 240 may be loaded.

To reduce cache miss latencies, the example prefetch instruction insertion system 100 fetches data into processor caches before the data is used. In general, the example prefetch instruction insertion system 100 may use MRTE type information and hardware such as the PMU 120 to monitor one or more samples, the GC 130 to place objects, and the compiler 140 to recompile methods to dynamically insert prefetch instructions. To illustrate these concepts, an example metadata graph 400 of FIG. 4 includes type "Item" 410, type "String" 420, 430, and type "Char array" 440, 450. Type "Item" 410 points to two instances of type "String" 420, 430 via fields "name" 460 and "brandInfo" 470, respectively. Field "name" 460 points to an instance of type "Char array" 440 via field "value" 480. Likewise, field "brandInfo" 470 points to an instance of type "Char array" 450 via field "value" 490. Referring to FIG. 5, the GC 130 generates a DMT 500 associated with the LDS 400 during heap traversal. As the GC 130 traverses the heap, the GC 130 identifies instances of delinquent types possible by using delinquent type identifier field in the VTable, which includes a field to identify the type of an object. When such an object is identified, the GC 130 determines whether the object is one of the objects associated with a sample from the PMU 120. The GC 130 then iterates through each reference field in the object to determine whether a child type (i.e., a referent) is an instance of another object of a distinguished type. If a child object is identified as associated with a delinquent type, the two instances associated with the child object include four possible object/type relationships: 1) type-to-type (T→T), 2) type-to-object (T→O), 3) object-to-type (O→T), and 4) object-to-object (O→O).

Figure 4:
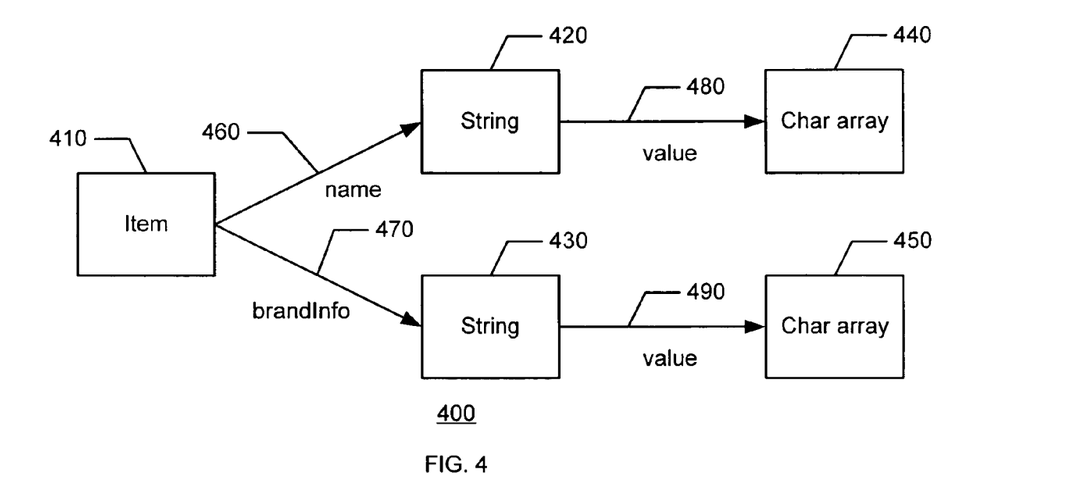
FIG. 4 is a block diagram representation of an example metadata graph associated with the example prefetch instruction insertion system shown in FIG. 1.

The GC 130 keeps track of each of the above object/type relationships between delinquent types in the DMT 500 (i.e., an N×N table for each pair of the N delinquent types). The GC 130 also keeps track of each field of a delinquent type, which is a reference field pointing to another delinquent type. In the LDS 400, each element is a linked list of nodes representing fields. Each of the nodes record object/type information corresponding to that particular field. The DMT 500 is easily accessible because the LDS 400 is indexed based on the unique delinquent type identifiers stored in the VTable. At the end of the heap traversal, the DMT 500 encodes the heap connectivity and the object/type relationships between each of the delinquent types.

For example, the DMT 500 includes delinquent type identifiers corresponding to child types 510 (i.e., referent) on the x-axis, and delinquent type identifiers corresponding to parent types 520 (i.e., source) on the y-axis. Each element of the LDS 400 corresponds to fields between connected delinquent types or null if no field connects the two types. In one particular example, the element of (type_id 2, type_id 0) consists of a linked list of two nodes including one node corresponding to the field "name" connecting type "Item" to type "String" and another node corresponding to the field "brandInfo" connecting type "Item" to type "String" as well. The two nodes also include instance/type counters that are updated during heap traversal. When an edge connecting an instance of "Item" pointing to "String" via offset for field "name" is identified by the GC 130, for example, the GC 130 updates the instance/type counters based on whether type "Item" and/or field "name" is a delinquent object.

A delinquent edge connects a parent type to a child type and represents a delinquent load of the child type using a reference field in the parent type. The GC 130 uses DMT 500 to identify delinquent edges. For each pair of delinquent types, the GC 130 examines the DMT 500 to determine if heap traversal identified an edge connecting the pair of delinquent type. If an edge is identified, the GC 130 sums the O→O and the T→O delinquent relationships for the identified edge. If the sum is greater than a particular lower bound N (i.e., a small fraction of the total number of distinguished objects), then the GC 130 considers the identified edge as a delinquent edge candidate and calculates a complex edge weight (CEW):

$$CEW = 100*O \rightarrow O + 10*T \rightarrow O + O \rightarrow T$$

CEW provides the highest weighting to the O→O component because the O→O component represents good evidence that the application followed the identified edge and may cause a cache miss. The T→O component is important because the T→O indicates how a known delinquent object following an edge (e.g., reference field) from a delinquent type. The O→T component is less important because the O→T component provides less assurance that the identified edge leads to a delinquent object (e.g., multiple fields in a delinquent type have the same time). The GC 130 also sorts the delinquent edge candidates based on the corresponding CEWs to filter all but the topmost edges. This information is stored in the DMT 500. The GC 130 links the parent type 420 to the child type 410, and propagates the instance/type edge information. As a result, each of the edges includes a weight indicating its contribution to latency.

A delinquent path includes one or more delinquent edges and related delinquent edges, and represents a traversal of an LDS that frequently misses. The type of the first object in a delinquent path is the delinquent base type. To locate where to inject prefetch instructions, the delinquent base type and the load associated to the delinquent base type are identified. The GC 130 generates delinquent paths by composing delinquent edges. Initially, each delinquent edge is a delinquent path. To lengthen a delinquent path, the GC 130 recursively identifies an edge with a parent type that matches the child type of the last edge in the path. The algorithm performed by the GC 130 terminates once the longest path for each delinquent edge is identified. Each path includes a weight equal to the sum of the CEWs of the edges associated with the path. This delinquent path information is represented in the metadata graph 400.

Figure 6:
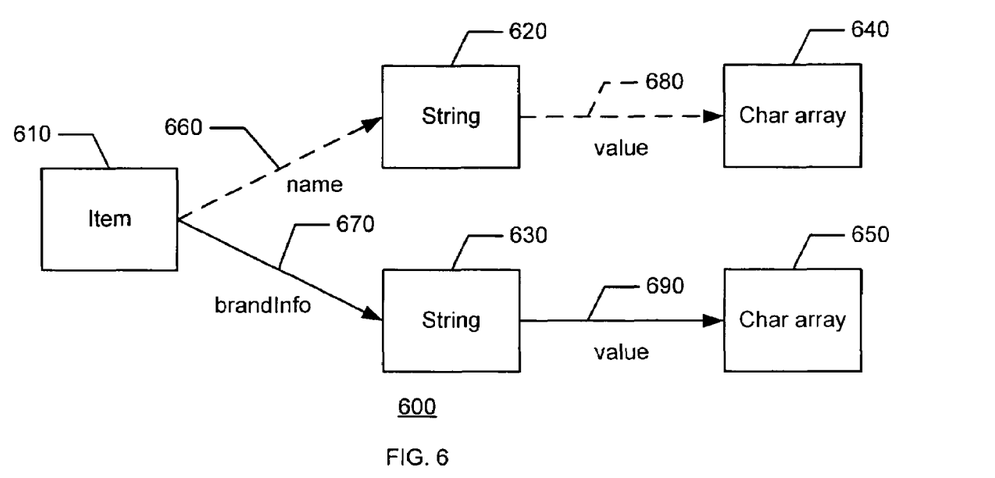
FIG. 6 is a block diagram representation of an example LDS associated with the example prefetch instruction insertion system shown in FIG. 1.

In the example of FIG. 6, the illustrated LDS 600 includes type "Item" 610, type "String" 620, 630, and type "Char array" 640, 650. Type "Item" 610 points to an instance of type "String" 630 via a field of "brandInfo" 670. Each of the delinquent types in a path is associated with high latency miss IPs. Thus, the paths include the IPs associated with the base where the first cache miss is identified. The GC 130 identifies the methods including one of the IPs to insert prefetch instructions. To identify the delinquent IPs, the GC 130 sorts data from the PMU 120 based on IPs loading a delinquent type. The GC 130 identifies an IP as a delinquent IP if that particular IP is associated with more than a given number of cache misses attributed to a delinquent type (e.g., ten percent of the total number of cache misses).

Figure 7:
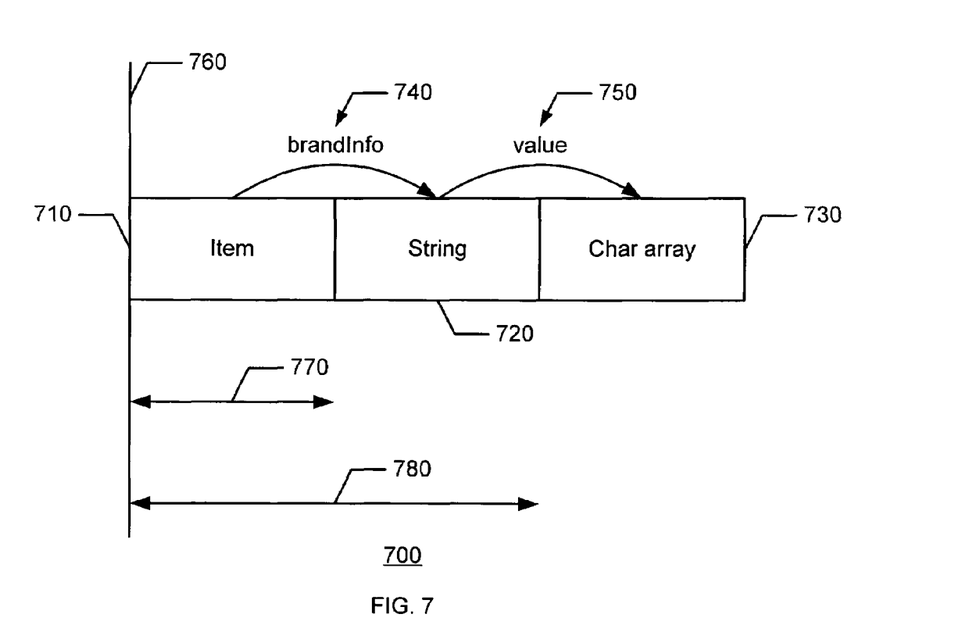
FIG. 7 is a block diagram representation of an example heap of the example prefetch instruction insertion system shown in FIG. 1.
Figure 8:
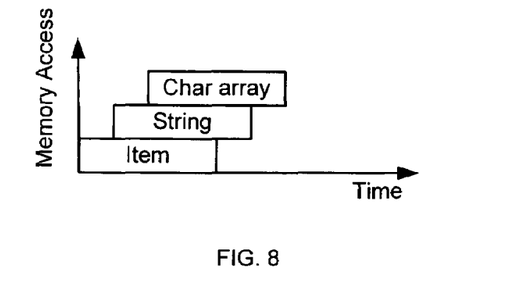
FIG. 8 is a timing diagram representation of one manner in which the example metadata graph shown in FIG. 4 may be traversed by the example prefetch instruction insertion system shown in FIG. 1 during runtime.

In the example of FIGS. 7 and 8, the illustrated heap 700 includes type "Item" 710, type "String" 720, and type "Char array" 730. The type "Item" 710 points to the type "String" 720 via the field "brandInfo" 740. The type "String" 720 points to the type "Char array" 730 via the field "value" 750. Because the objects 710, 720, 730 are placed by the GC 130 in order, a uniform delta pattern is used to insert prefetch instructions when the address of the base instruction 760 (i.e., base of the path) is known. By using deltas (i.e., distance separating each of the objects 710, 720, 730 from each other), data dependency may be avoided and timely prefetches may be permitted. For example, the memory address of type "String" 720 is the address of the base instruction 760 plus a delta 770 of type "Item" 710. In another example, the memory address of type "Char array" 730 is the address of the base instruction 760 plus a delta 780 of type "Item" 710 and type "String" 720. As a result, the compiler 140 may use the deltas to inject prefetches of type "String" 720 and type "Char array" 730 so that the prefetch latency overlaps the miss latency of type "Item" 710 as shown in FIG. 8.

The GC 130 processes each delinquent object derived from samples from the PMU 120 and modifies the path structures by adding a list of effective IPs and associated deltas to objects that miss along the path. All deltas are relative to the object at the base of the path 760. The effective IP(s) corresponds to delinquent IP(s) of misses loading the base delinquent type object.

For each delinquent object, the GC 130 identifies and inspects each delinquent path. If the type of delinquent object matches the object type at the base of a path, for example, the GC 130 identifies that path as an interesting path. For each interesting path, the GC 130 iterates over the edges in the path following the appropriate links (i.e., fields) in the delinquent objects. The GC 130 determines a delta from the path base object to the target object of each edge. The delta and the IP associated with the base delinquent instance (i.e., the path base object) are combined into bins to form an edge histogram. After iterating over each of the delinquent objects, the GC 130 summarizes the histograms of deltas and IPs for each path. The GC 130 inspects each of the delta bins and identifies any bin that includes more that a threshold of the instances (e.g., more than 10 percent). The deltas and the IPs are inserted into the metadata graph 400 along the path structure. Based on this information, the compiler 140 adds prefetch instructions into the appropriate methods where the address of the base object is first materialized. As a result, the load instructions of other addresses in the LDS may be executed without further delay.

Using a frontier-pointer allocation scheme, a garbage collector may generate allocation order object placement. For many applications, allocation order results in delinquent objects having regular deltas along delinquent paths. However, frontier-pointer allocation schemes may suffer from fragmentation, which is a well-known garbage collector pathology. To maintain allocation order and also to counter fragmentation, the GC 130 may employ sliding compaction. If the GC 130 performs sliding compaction prior to calculating deltas, the GC 130 may generate more regular deltas. Compaction or any other object movement, however, may require the GC to update the delinquent object derived from the PMU 120 to refer to the copied versions of the delinquent objects. The GC 130 may also move object such that the layout of the object in memory may induce deltas. The layout may be driven by the delinquent paths and deltas identified by the GC 130. After the GC 130 generates the layout, the prefetch instructions may be more effective.

Figure 9:
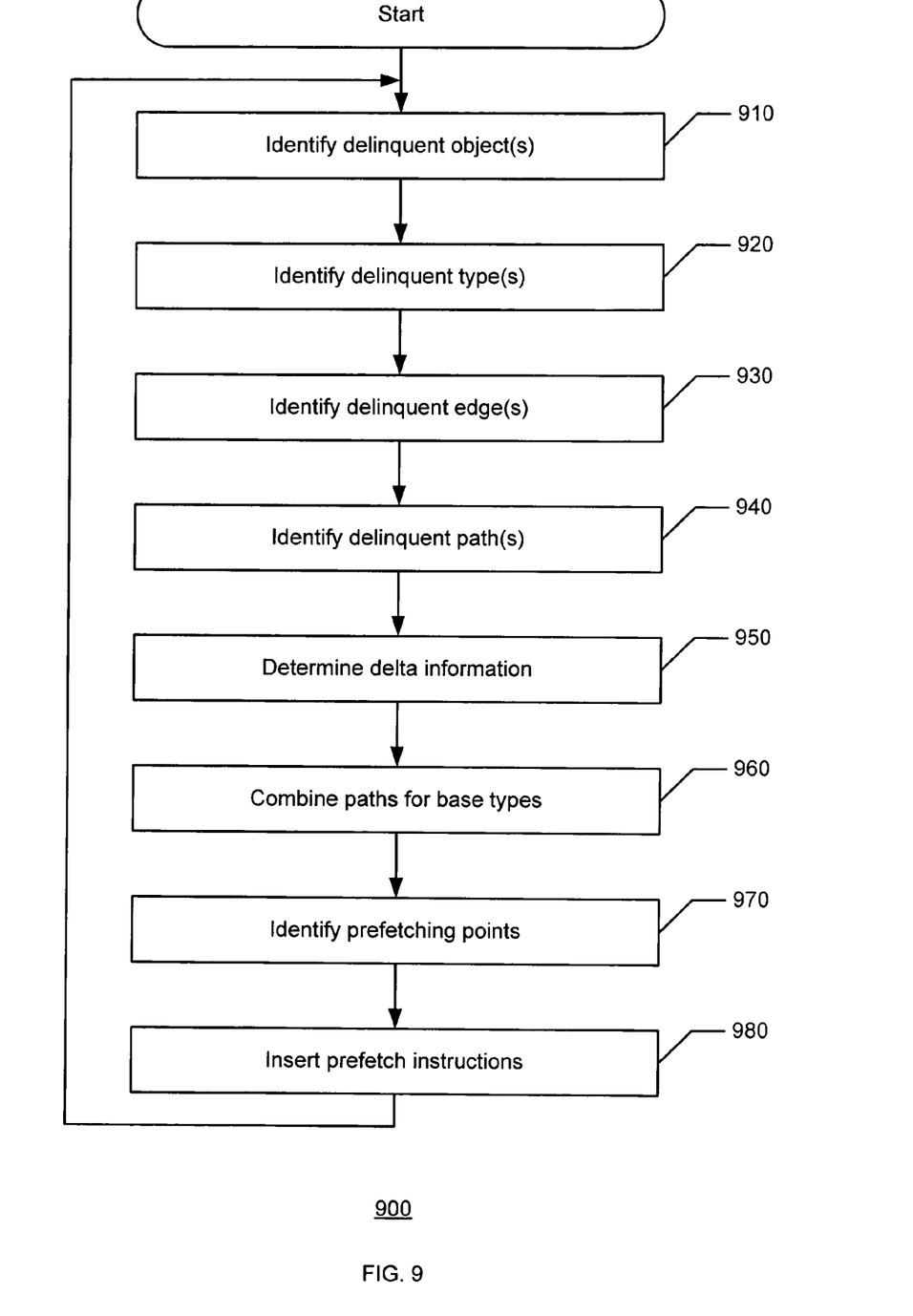
FIG. 9 is a flow diagram representation of example machine readable instructions that may be executed to implement the example prefetch instruction insertion system shown in FIG. 1.

A flow diagram 900 representing machine readable instructions that may be executed by a processor to insert prefetch instructions is illustrated in FIG. 9. Persons of ordinary skill in the art will appreciate that the instructions may be implemented in any of many different ways utilizing any of many different programming codes stored on any of many computer or machine-readable mediums such as a volatile or nonvolatile memory or other mass storage device (e.g., a floppy disk, a CD, and a DVD). For example, the machine readable instructions may be embodied in a machine-readable medium such as an erasable programmable read only memory (EPROM), a read only memory (ROM), a random access memory (RAM), a magnetic media, an optical media, and/or any other suitable type of medium. Alternatively, the machine readable instructions may be embodied in a programmable gate array and/or an application specific integrated circuit (ASIC). Further, although a particular order of actions is illustrated in FIG. 9, persons of ordinary skill in the art will appreciate that these actions can be performed in other temporal sequences. Again, the flow diagram 900 is merely provided as an example of one way to insert prefetch instructions.

The flow diagram 900 begins with the GC 130 identifying delinquent objects based on one or more samples associated with cache misses from the PMU 110 (block 910). As noted above, a delinquent object may be an object that causes high latency. Each sample includes the effective address of a cache miss, the IP of the load instruction causing the cache miss, and the latency of the cache miss. In particular, the GC 130 identifies a delinquent object associated with each effective address.

For each delinquent object, the GC 130 identifies a delinquent type (block 920). That is, the delinquent objects are abstracted up into the delinquent types. In particular, a delinquent type is an MRTE type and/or class associated with instances that contribute to high latency cache misses.

Based on the DMT 500 of the delinquent types, the GC 130 identifies delinquent edges (block 930). In particular, a delinquent edge is a field and/or array element access connecting two delinquent types in the order of access (i.e., points to delinquent types). The GC 130 performs heap traversal to identify objects of the one or more samples from the PMU 210 that are reachable by the running application 110. During the heap traversal, the GC 130 uses the objects to collect statistics on the connectivity between instances of delinquent types in the heap. The connectivity is used to approximate the delinquent paths of the running applications 110. The connectivity statistics are accumulated in the DMT 500.

Based on the delinquent edges, the GC 130 identifies delinquent paths (block 940). In particular, a delinquent path is two or more delinquent types connected by one or more delinquent edges. For each delinquent edge, the longest path that begins with that particular edge is a delinquent path.

For each delinquent path, the GC 130 determines delta information (block 950). The GC 130 inspects the delinquent objects and generates deltas between the base delinquent type and other delinquent types. The GC 130 collects deltas for each delinquent IP associated with the base delinquent types (block 960).

The compiler 140 identifies prefetching points associated with the load of the for a base type (block 970). In particular, the IP associated with the load instruction of a base delinquent type is used to identify methods that warrant recompilation to include prefetch instructions. The compiler 140 generates the target of the prefetch instruction by combining the address of the base delinquent object (i.e., the base address) with the deltas. In particular, the compiler 140 sums the base address with the deltas. Accordingly, the compiler 140 inserts prefetch instructions into the running application 110 at the prefetching points (block 980). Thus, the prefetch instruction insertion system 100 uses the latency of the cache miss associated with the first object in a delinquent path to hide the latency of the remaining cache misses in the delinquent path.

Figure 10:
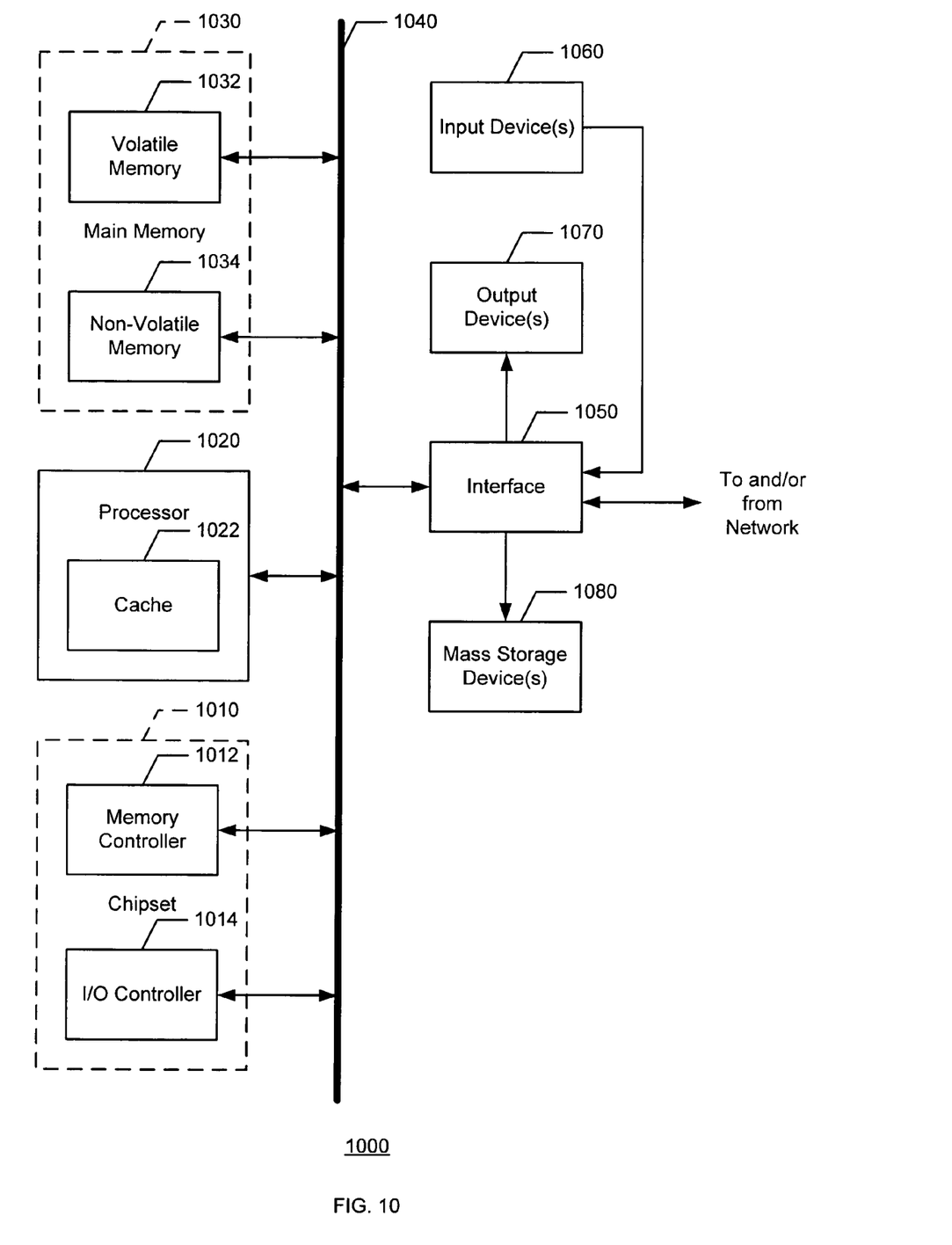
FIG. 10 is a block diagram representation of an example processor system that may be used to implement the example prefetching insertion system shown in FIG. 1.

FIG. 10 is a block diagram of an example processor system 1000 adapted to implement the methods and apparatus disclosed herein. The processor system 1000 may be a server computer, a desktop computer, a laptop computer, a notebook computer, a personal digital assistant (PDA), a server, an Internet appliance or any other type of computing device.

The processor system 1000 illustrated in FIG. 10 provides memory and I/O management functions, as well as a plurality of general purpose and/or special purpose registers, timers, etc. that are accessible or used by a processor 1020. The processor 1020 is implemented using one or more processors. For example, the processor 1020 may be implemented using one or more of the Intel® Pentium® technology, the Intel® Itanium® technology, Intel® Centrino™ technology, and/or the Intel® XScale® technology. In the alternative, other processing technology may be used to implement the processor 1020. The processor 1020 includes a cache 1022, which may be implemented using a first-level unified cache (L1), a second-level unified cache (L2), a third-level unified cache (L3), and/or any other suitable structures to store data as persons of ordinary skill in the art will readily recognize.

As is conventional, the volatile memory controller 1036 and the non-volatile memory controller 1038 perform functions that enable the processor 1020 to access and communicate with a main memory 1030 including a volatile memory 1032 and a non-volatile memory 1034 via a bus 1040. The volatile memory 1032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 1034 may be implemented using flash memory, Read Only Memory (ROM), Electrically Erasable Programmable Read Only Memory (EEPROM), and/or any other desired type of memory device.

The processor system 1000 also includes an interface circuit 1050 that is coupled to the bus 1040. The interface circuit 1050 may be implemented using any type of well known interface standard such as an Ethernet interface, a universal serial bus (USB), a third generation input/output interface (3GIO) interface, and/or any other suitable type of interface.

One or more input devices 1060 are connected to the interface circuit 1050. The input device(s) 1060 permit a user to enter data and commands into the processor 1020. For example, the input device(s) 1060 may be implemented by a keyboard, a mouse, a touch-sensitive display, a track pad, a track ball, an isopoint, and/or a voice recognition system.

One or more output devices 1070 are also connected to the interface circuit 1050. For example, the output device(s) 1070 may be implemented by display devices (e.g., a light emitting display (LED), a liquid crystal display (LCD), a cathode ray tube (CRT) display, a printer and/or speakers). The interface circuit 1050, thus, typically includes, among other things, a graphics driver card.

The processor system 1000 also includes one or more mass storage devices 1080 to store software and data. Examples of such mass storage device(s) 1080 include floppy disks and drives, hard disk drives, compact disks and drives, and digital versatile disks (DVD) and drives.

The interface circuit 1050 also includes a communication device such as a modem or a network interface card to facilitate exchange of data with external computers via a network. The communication link between the processor system 1000 and the network may be any type of network connection such as an Ethernet connection, a digital subscriber line (DSL), a telephone line, a cellular telephone system, a coaxial cable, etc.

Access to the input device(s) 1060, the output device(s) 1070, the mass storage device(s) 1080 and/or the network is typically controlled by the I/O controller 1014 in a conventional manner. In particular, the I/O controller 1014 performs functions that enable the processor 1020 to communicate with the input device(s) 1060, the output device(s) 1070, the mass storage device(s) 1080 and/or the network via the bus 1040 and the interface circuit 1050.

While the components shown in FIG. 10 are depicted as separate blocks within the processor system 1000, the functions performed by some of these blocks may be integrated within a single semiconductor circuit or may be implemented using two or more separate integrated circuits. For example, although the I/O controller 1014, the volatile memory controller 1036, and the non-volatile memory controllers 1038 are depicted as separate blocks, persons of ordinary skill in the art will readily appreciate that the I/O controller 1014, the volatile memory controller 1036, and the non-volatile memory controllers 1038 may be integrated within a single semiconductor circuit.

Although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. A method comprising:
identifying one or more samples associated with cache misses using a performance monitoring unit in a processor system;
abstracting the one or more samples into a first linked data structure representing a parent delinquent object type determined to be connected to a child delinquent object type by a first field of the parent delinquent object type, the first linked data structure linked to a second linked data structure abstracted from the one or more samples when the parent delinquent object type is determined to be linked to the child delinquent object type by a second field of the parent delinquent object type different from the first field;
using the first linked data structure to identify one or more paths associated with high latency cache misses; and
identifying one or more prefetch points associated with the one or more paths at which to insert one or more prefetch instructions.

2. A method as defined in claim 1, wherein abstracting the one or more samples into the first linked data structure comprises abstracting the one or more samples into two or more managed heap objects based on at least one of an instruction pointer, an effective address, or latency information associated with each of the one or more samples.

3. A method as defined in claim 1, wherein abstracting the one or more samples into the first linked data structure comprises generating at least one of a delinquent object, a delinquent object type, a delinquent edge, a delinquent path, a base delinquent type, a delta type, or a delta offset from the one or more samples.

4. A method as defined in claim 1, wherein abstracting the one or more samples into the first linked data structure comprises identifying one or more delinquent object types associated with at least one delinquent object.

5. A method as defined in claim 1, wherein using the first linked data structure to identify one or more paths associated with high latency cache misses comprises identifying one or more delinquent edges associated with at least one delinquent object type.

6. A method as defined in claim 1, wherein using the first linked data structure to identify one or more paths associated with high latency cache misses comprises identifying a delta between the parent delinquent object type and the child delinquent object type by inspecting objects in a heap, and further comprising determining the one or more prefetch instructions by combining one or more deltas along the one or more paths with an address of a base delinquent object having the parent delinquent object type.

7. A method as defined in claim 1, wherein identifying the one or more prefetch points comprises determining an instruction pointer associated with a load instruction for loading a delinquent object type.

8. A machine readable storage medium storing instructions, which when executed, cause a machine to:
identify one or more samples associated with cache misses using a performance monitoring unit in a processor system;
generate delinquent information comprising a delinquent path with deltas based on sample information associated with the one or more samples and based on a layout of objects in a heap, wherein the layout of objects is arranged to preserve deltas along the delinquent path, the delinquent information further comprising a histogram formed from the deltas; and
identify a prefetch point based on the delinquent information to insert one or more prefetch instructions corresponding to one or more deltas associated with one or more respective histogram bins exceeding a threshold.

9. A machine readable storage medium as defined in claim 8, wherein the instructions cause the machine to generate the delinquent information based on at least one of an instruction pointer, an effective address, or latency information associated with each of the one or more samples.

10. A machine readable storage medium as defined in claim 8, wherein the instructions cause the machine to generate the delinquent information by determining at least one of a delinquent object, a delinquent type, a delinquent edge, a base delinquent type, a delta type, or a delta offset.

11. A machine readable storage medium as defined in claim 8, wherein the instructions cause the machine to generate the delinquent information by identifying one or more delinquent types associated with at least one delinquent object.

12. A machine readable storage medium as defined in claim 8, wherein the instructions cause the machine to generate the delinquent information by identifying one or more delinquent edges associated with at least one delinquent type.

13. A machine readable storage medium as defined in claim 8, wherein the instructions cause the machine to generate the delinquent information by identifying one or more delinquent paths associated with at least one delinquent edge.

14. A machine readable storage medium as defined in claim 8, wherein the instructions cause the machine to identify the prefetch point based on the delinquent information and to determine the one or more prefetch instructions by combining an address of a base delinquent object and delta information.

15. An apparatus comprising:
a performance monitoring unit implemented at least in part by hardware to provide one or more samples of cache misses;
a garbage collector in communication with the performance monitoring unit to identify one or more paths between linked data objects which cause cache misses based on the one or more samples, the one or more paths identified by abstracting the one or more samples into a first linked data structure representing a parent delinquent object type determined to be connected to a child delinquent object type by a first field of the parent delinquent object type, the first linked data structure linked to a second linked data structure abstracted from the one or more samples when the parent delinquent object type is determined to be linked to the child delinquent object type by a second field of the parent delinquent object type different from the first field, the first linked data structure including a set of counters to track instances of the parent delinquent object type being linked to the child delinquent object type by the first field, the instances determined by traversing a heap storing managed objects each having at least one of the parent delinquent object type or the child delinquent object type; and
a compiler in communication with the garbage collector to identify at least one prefetch point associated with the one or more paths to receive one or more prefetch instructions.

16. An apparatus as defined in claim 15, wherein the one or more samples comprise at least one of an instruction pointer, an effective address, or latency information.

17. An apparatus as defined in claim 15, wherein the garbage collector is to identify the one or more paths between the linked data objects by identifying at least one of a delinquent object, a delinquent object type, a delinquent edge, a delinquent path, a base delinquent type, a delta type, or a delta offset from the one or more samples.

18. An apparatus as defined in claim 15, wherein the garbage collector is to identify_one or more delinquent object types associated with at least one delinquent object.

19. An apparatus as defined in claim 15, wherein the garbage collector is to identify one or more delinquent edges associated with at least one delinquent object type.

20. An apparatus as defined in claim 15, wherein the garbage collector is to identify the one or more paths between the linked data objects based on a layout of objects in a heap.

21. An apparatus as defined in claim 15, wherein the compiler is to combine an address of a base object of the linked data objects with delta information to determine the one or more prefetch instructions.

22. A processor system comprising:
a dynamic random access memory (DRAM); and
a processor operatively coupled to the DRAM, the processor is programmed to:
identify one or more samples associated with cache misses using a performance monitoring unit in a processor system,
generate delinquent information comprising a delinquent path and one or more deltas between objects along the delinquent path based on sample information associated with the one or more samples and based on a layout of objects in a heap, the delinquent information further comprising a histogram formed from the one or more deltas, and
identify a prefetch point based on the delinquent information to insert one or more prefetch instructions corresponding to the one or more deltas associated with one or more respective histogram bins exceeding a threshold.

23. A processor system as defined in claim 22, wherein the processor is programmed to generate the delinquent information based on at least one of an instruction pointer, an effective address, or latency information associated with each of the one or more samples.

24. A processor system as defined in claim 22, wherein the processor is programmed to determine at least one of a delinquent object, a delinquent type, a delinquent edge, a base delinquent type, a delta type, or a delta offset.

25. A processor system as defined in claim 22, wherein the processor is programmed to identify one or more delinquent types associated with at least one delinquent object.

26. A processor system as defined in claim 22, wherein the processor is programmed to identify one or more delinquent edges associated with at least one delinquent type.

27. A processor system as defined in claim 22, wherein the layout of objects is arranged to preserve deltas along the delinquent paths.

28. A processor system as defined in claim 22, wherein the processor is programmed to combine an address of a base delinquent object and delta information to determine the one or more prefetch instructions.

29. A method as defined in claim 1, wherein abstracting the one or more samples into the first linked data structure comprises determining whether a first delinquent object or object type is linked to a second delinquent object or object type.

30. A method as defined in claim 29, wherein connectivity between the first and second delinquent objects or object types is used to identify the one or more paths associated with high latency cache misses.

* * * * *

UNITED STATES PATENT AND TRADEMARK OFFICE
CERTIFICATE OF CORRECTION

PATENT NO. : 7,577,947 B2
APPLICATION NO. : 10/741897
DATED : August 18, 2009
INVENTOR(S) : Subramoney et al.

It is certified that error appears in the above-identified patent and that said Letters Patent is hereby corrected as shown below:

Col. 9, line 56 After "samples into" insert -- two or more linked data structures comprising --.

Col. 9, line 65 After "the first field" insert -- , the first linked data structure including a set of counters to track instances of the parent delinquent object type being linked to the child delinquent object type by the first field --.

Col. 9, line 66 After "using the" delete "first linked data structure" and insert -- two or more linked data structures --.

Col. 9, line 67 After "paths" delete "associated with" and insert -- between linked data objects which cause --.

Col. 10, line 5 After "samples into" delete "the first linked data structure" and insert -- two or more linked data structures --.

Col. 10, line 11 After "samples into" delete "the first linked data structure" and insert -- two or more linked data structures --.

Col. 10, line 17 After "samples into" delete "the first linked data structure" and insert -- two or more linked data structures --.

Col. 10, line 20 After "using the" delete "first linked data structure" and insert -- two or more linked data structures --.

Col. 10, line 25 After "using the" delete "first linked data structure" and insert -- two or more linked data structures --.

Col. 10, line 44 After "with deltas" insert -- between linked data objects along the delinquent path --.

Col. 10, line 46 After "in a heap" insert -- wherein the two or more linked data structures comprise a first linked data structure representing a parent delinquent object type determined to be connected to a child delinquent object type by a first field of the parent delinquent object type, the first linked data structure linked to a second linked data structure abstracted from the one or more samples when the parent delinquent object type is determined to be linked to the child delinquent object type by a second field of the parent delinquent object type different from the first field, the first linked data structure including a set of counters to track instances of the parent delinquent object type being linked to the child delinquent object type by the first field, --.

Col. 12, line 16 After "deltas between" insert -- linked data --.

CERTIFICATE OF CORRECTION (continued)
U.S. Pat. No. 7,577,947 B2

Col. 12, line 17 After "based on" delete "sample information associated with" and insert -- two or more linked data structures abstracted from --.

Col. 12, line 19 After "object in a heap," insert -- wherein the two or more linked data structures comprise a first linked data structure representing a parent delinquent object type determined to be connected to a child delinquent object type by a first field of the parent delinquent object type, the first linked data structure linked to a second linked data structure abstracted from the one or more samples when the parent delinquent object type is determined to be linked to the child delinquent object type by a second field of the parent delinquent object type different from the first field, the first linked data structure including a set of counters to track instances of the parent delinquent object type being linked to the child delinquent object type by the first field, --.

Col. 12, line 50 After "samples into" delete "the first linked data structure" and insert -- two or more linked data structures --.

Signed and Sealed this

Ninth Day of February, 2010

David J. Kappos
*Director of the United States Patent and Trademark Office*